(12) United States Patent
Min et al.

(10) Patent No.: US 11,260,452 B2
(45) Date of Patent: *Mar. 1, 2022

(54) METHOD FOR PRODUCING NICKEL NANOPOWDER

(71) Applicant: SOLUETA CO., LTD., Ansan-si (KR)

(72) Inventors: Eui-Hong Min, Seongnam-si (KR); Sang-Ho Cho, Hwaseong-si (KR); Buck-Keun Choi, Hwaseong-si (KR)

(73) Assignee: SOLUETA CO., LTD., Ansan-si (KR)

( * ) Notice: Subject to any disclaimer, the term of this patent is extended or adjusted under 35 U.S.C. 154(b) by 148 days.

This patent is subject to a terminal disclaimer.

(21) Appl. No.: 16/608,944

(22) PCT Filed: Apr. 27, 2018

(86) PCT No.: PCT/KR2018/004902
§ 371 (c)(1),
(2) Date: Oct. 28, 2019

(87) PCT Pub. No.: WO2018/199677
PCT Pub. Date: Nov. 1, 2018

(65) Prior Publication Data
US 2020/0189003 A1 Jun. 18, 2020

(30) Foreign Application Priority Data
Apr. 28, 2017 (KR) .................. 10-2017-0055136

(51) Int. Cl.
*B22F 9/04* (2006.01)
*B22F 9/20* (2006.01)
(Continued)

(52) U.S. Cl.
CPC ............. *B22F 9/20* (2013.01); *B22F 1/0018* (2013.01); *B22F 9/04* (2013.01);
(Continued)

(58) Field of Classification Search
None
See application file for complete search history.

(56) References Cited

U.S. PATENT DOCUMENTS

2018/0250752 A1* 9/2018 Ozaki ................. B22F 9/26
2019/0177238 A1* 6/2019 Yi ..................... C04B 35/62655

FOREIGN PATENT DOCUMENTS

JP 62-247010 A 10/1987
KR 10-2004-0072991 A 8/2004
(Continued)

OTHER PUBLICATIONS

English translation of KR 2004-0072991 (originally published Aug. 19, 2004) from Espacenet.*

(Continued)

*Primary Examiner* — George Wyszomierski
(74) *Attorney, Agent, or Firm* — Sughrue Mion, PLLC

(57) ABSTRACT

A method for producing nickel nanopowder is introduced. For this, the present invention relates to a method for producing nickel nanopowder, including: (a) a step of preparing nickel oxide configured in the form of an oxide; (b) a nickel oxide nanopowder production step of pulverizing the nickel oxide so as to produce nano-sized nickel oxide nanopowder; (c) a step of drying the nickel oxide nanopowder; (d) a step of heat-treating the nickel oxide nanopowder so as to produce natural metal nickel nanopowder; and (e) a step of crushing the heat-treated nickel oxide nanopowder.

5 Claims, 3 Drawing Sheets

(51) Int. Cl.
*B22F 1/00* (2022.01)
*H01G 4/008* (2006.01)
(52) U.S. Cl.
CPC ..... *B22F 2009/045* (2013.01); *B22F 2301/15* (2013.01); *B22F 2304/05* (2013.01); *H01G 4/008* (2013.01)

(56) References Cited

FOREIGN PATENT DOCUMENTS

| | | |
|---|---|---|
| KR | 10-2008-0068196 A | 7/2008 |
| KR | 10-2009-0129611 A | 12/2009 |
| KR | 10-1116192 B1 | 2/2012 |
| KR | 2013-0109325 A * | 10/2013 |

OTHER PUBLICATIONS

English translation of KR 2013-0109325 (originally published Oct. 6, 2013) from Espacenet.*
International Search Report for PCT/KR2018/004902 dated Aug. 2, 2018 (PCT/ISA/210/).

* cited by examiner

NiO reduced at H$_2$ atmosphere (heating rate 10°C/min)

METHOD FOR PRODUCING NICKEL NANOPOWDER

CROSS REFERENCE TO RELATED APPLICATIONS

This application is a National Stage of International Application No. PCT/KR2018/004902 filed Apr. 27, 2018, claiming priority based on Korean Patent Application No. 10-2017-0055136, filed Apr. 28, 2017, the entire disclosures of which are incorporated herein by reference.

TECHNICAL FIELD

The present invention relates to a method for producing nickel nanopowder, and more specifically, to a method for producing nickel nanopowder for the MLCC obtained by nanopowdering nickel used in a multilayer ceramic capacitor (MLCC) and crushing the nanopowdered nickel.

BACKGROUND ART

A nickel powder for electronic materials is mainly used in materials for MLCC electrode, etc.

Hereinafter, a cross-section of a general MLCC will be briefly described.

The MLCC includes a dielectric and an electrode which are alternately stacked, and the MLCC has a terminal electrode made of copper or the like formed in both end portions thereof. The electrode is formed such that one end portion of the electrode is connected to the terminal electrode while the other end portion of the electrode is not connected to the terminal electrode.

The dielectric is formed to a thickness of about 6 μm, and the electrode is formed to a thickness of 1 μm or less.

In this case, a nickel powder is mainly used as an electrode material.

Conventionally, a nickel powder for forming such an MLCC electrode has been produced from an aqueous solution of a nickel salt by a liquid reducing process.

However, the nickel powder produced by the liquid reducing process has a problem that it is difficult to apply the nickel powder as electronic materials such as the MLCC electrode since the nickel powder is severely aggregated, and it is difficult to control shape and size of the nickel powder.

Meanwhile, local manufacturing has been essentially demanded since a large proportion of the nickel powder for forming the MLCC electrode has been imported from foreign countries, and there has been a problem of producing a nickel oxide nanopowder since an exact production process has not been developed from a process of preparing nickel oxides in the form of an oxide and up to a process of crushing the nickel oxides.

DISCLOSURE

Technical Problem

Due to the foregoing conventional problem that local manufacturing of the nickel powder is urgently required since a large proportion of the nickel powder has been imported from foreign countries, the purpose of the present invention is to provide a method for producing a nickel nanopowder and an exact production process from a process of preparing nickel oxides in the form of an oxide and up to a process of crushing the nickel oxides.

Technical Solution

A method for producing a nickel nanopowder is introduced.

A method for producing a nickel nanopowder according to the present invention includes
(a) a step of preparing a nickel oxide configured in the form of an oxide, (b) a nickel oxide nanopowder production step of pulverizing the nickel oxide to produce a nano-sized nickel oxide nanopowder, (c) a step of drying the nickel oxide nanopowder, (d) a step of heat-treating the nickel oxide nanopowder to produce a pure metal nickel nanopowder, and (e) a step of crushing the heat-treated nickel oxide nanopowder.

Advantageous Effects

A method for producing a nickel nanopowder for MLCC, i.e., the present invention included of the foregoing method realizes various effects that the method not only can improve dispersibility and yield of nickel powder, but also enables the produced nickel powder to be suitably used as an electrode material for MLCC, etc.

MODE OF THE INVENTION

Hereinafter, preferred embodiments of a method for producing a nickel nanopowder according to the present invention will be described with reference to the accompanying drawings.

Figure 1:
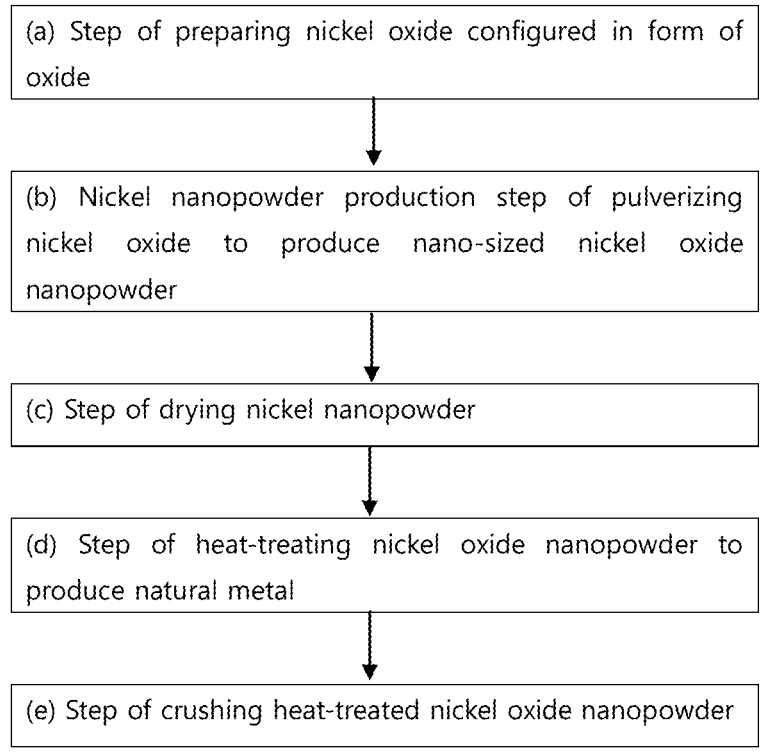
FIG. 1 is an overall flowchart illustrating a method for producing a nickel nanopowder according to the present invention.

FIG. 1 is an overall flowchart illustrating a method for producing a nickel nanopowder according to the present invention.

As illustrated in FIG. 1, a method for producing a nickel nanopowder according to the present invention includes (a) a step of preparing a nickel oxide configured in the form of an oxide, (b) a nickel oxide nanopowder production step of pulverizing the nickel oxide to produce a nano-sized nickel oxide nanopowder, (c) a step of drying the nickel oxide nanopowder, (d) a step of heat-treating the nickel oxide nanopowder to produce a natural metal nickel nanopowder, and (e) a step of crushing the heat-treated nickel oxide nanopowder.

As widely known in the art, nickel increases elastic modulus and electrical resistance, and a melting temperature section of nickel moves to high temperatures as an Ni content increases.

According to a conventional technique of pulverizing the nickel to produce a nano-sized nickel, a powder-type nickel has conventionally been produced by pulverizing metal such as nickel by plasma. However, it has not been possible to produce the metal such as nickel into a nano-sized powder since the process not only is very costly, but also allows pulverized powder to be recombined with each other between metals.

In order to solve such a problem, the present invention does not include pulverizing metal itself, but includes forming the metal into the form of an oxide to obtain a metal oxide, and pulverizing the metal oxide such that the metal oxide can be pulverized to a nano size by preventing pulverized oxides from being combined with each other again.

Namely, since a metal oxide of NiO is an oxide, the metal oxide of NiO is not agglomerated again, and can be pulverized into a nano-sized powder although the metal oxide of NiO is pulverized by a physical pulverizing device without using plasma.

In the present invention, a nano-sized nickel oxide nanopowder is produced by physically milling the nickel oxide using a rotating mill using a pulverizing medium.

Examples of the rotating mill may include a bead mill, and may additionally include ball mills such as a circulating bead mill, a circulating SC mill, a tilting ATT mill, and a basket mill.

Herein, the pulverizing medium preferably includes beads with a diameter of 0.3 to 3.0 mm. Further, the nickel oxide nanopowder can be produced by using methanol or ethanol as a solvent and pulverizing the nickel oxide at a rotation speed of 1,000 to 4,000 rpm for 10 to 30 hours in the nickel oxide nanopowder production step.

As results that the present applicant has repeatedly performed a testing operation several times, the most preferable pulverizing medium size range is suggested. It is difficult to physically pulverize the nickel oxide when the pulverizing medium is formed to a diameter of less than 0.3 mm, while there is a problem that it is hard to produce the nickel oxide nanopowder as it is difficult to pulverize the nickel oxide to a nano-size when the pulverizing medium is formed to a diameter of more than 3.0 mm.

Further, it is more preferable that the nickel oxide is also pulverized at a mixing ratio of NiO to methanol or ethanol of 1:5 since pulverization efficiency is lowered when the mixing ratio exceeds or falls behind the mixing ratio value.

On the other hand, beads used in pulverization are formed of at least one material selected from SUS (stainless steel), Zr, carbon steel, and steel.

When a nickel oxide nanopowder production step of pulverizing the nickel oxide to produce a nano-sized nickel oxide nanopowder is performed as described above, a process of drying the solvent is required since the solvent is coated on the nickel oxide nanopowder.

Since naturally drying the solvent coated on the nickel oxide nanopowder is very time consuming, the solvent coated on the nickel oxide nanopowder is dried in a chamber-type dryer, preferably within a temperature range of 50 to 70° C. to volatilize the solvent coated on the nickel oxide nanopowder in the present invention in order to increase process efficiency.

After drying the nickel nanopowder as described above, a step of heat-treating a dried nickel oxide nanopowder to produce a natural metal is performed.

Figure 2:
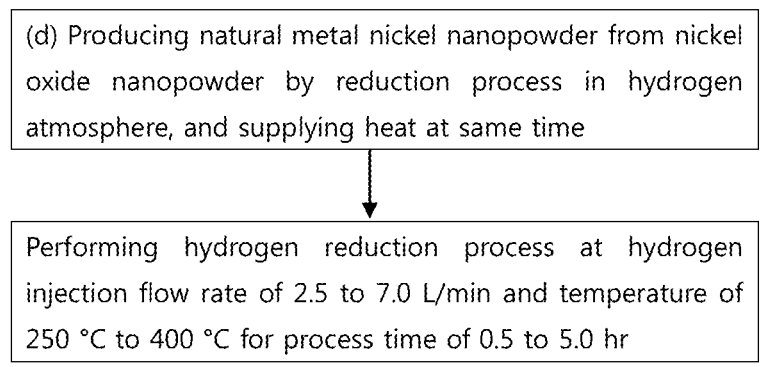
FIG. 2 is a view illustrating the step of heat-treating a nickel oxide nanopowder in a hydrogen atmosphere.

Namely, as illustrated in FIG. 2, a natural metal production step of producing a natural metal nickel nanopowder from the dried nickel oxide nanopowder by a reduction process in a hydrogen atmosphere is performed, and heat is simultaneously supplied in the process by an external heat supply source such as an electric heater.

This process is progressed in a general reduction furnace, and an example of hydrogen reduction is implemented by the following expression.

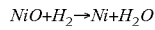

$$NiO+H_2 \rightarrow Ni+H_2O$$

When the nickel oxide nanopowder and hydrogen are injected into the reduction furnace by the foregoing hydrogen reduction process, and heat is supplied by the heat supply source including a general electric heater, etc., the natural metal nickel nanopowder can be produced.

There is an advantage that energy can be decreased in an actually 80% temperature range since temperature of converting into a liquid phase can be lowered (i.e., energy band gap is lowered) when using the above-mentioned nanopowder having nano-sized particles in an electrode material of MLCC by a later process.

The hydrogen reduction process includes applying heat while injecting hydrogen, and preferably includes applying heat while injecting hydrogen at a flow rate of 2.5 to 7.0 L/min in a process time range of 0.5 to 5.0 hr. At this time, the hydrogen reduction process is preferably performed at a temperature of the reduction furnace between 250° C. and 400° C. by adjusting temperature of the heat supply source.

Figure 3:
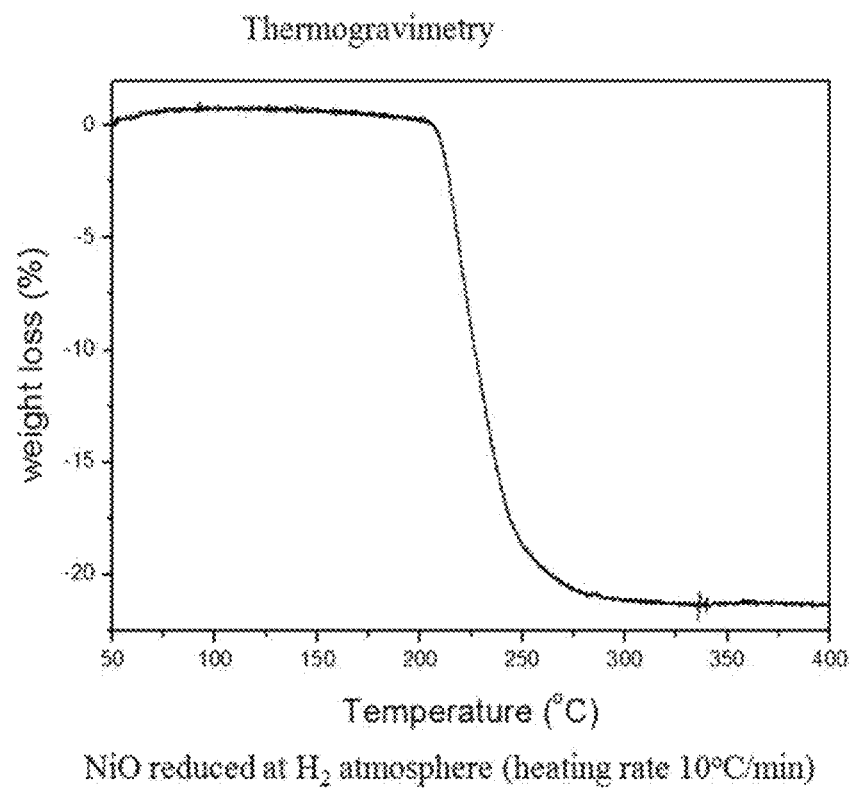
FIG. 3 is a thermogravimetric analysis graph showing an extent that weight of NiO is decreased while temperature is being increased in a hydrogen reduction process.

FIG. 3 is a graph showing an extent that weight of NiO is decreased while temperature is being increased in a hydrogen reduction process.

As illustrated, it can be confirmed that weight is reduced near 200° C. after maintaining a constant weight of NiO while temperature is gradually being increased, while weight of NiO is not reduced any more within a temperature range of 250 to 400° C.

That is, an optimal natural nickel metal can be produced by the hydrogen reduction process within this temperature range, and the present invention is also characterized by performing the hydrogen reduction process within the temperature range.

Meanwhile, since a so-called "neck" phenomenon of sticking up to nickel metal during the foregoing process may be generated, a so-called crushing process is performed to prevent generation of the "neck" phenomenon.

Preferably, the crushing process is performed at a rotation speed of 1,000 to 4,000 rpm for 1 to 5 hours using beads with a diameter of 0.3 to 3.0 mm as a crushing medium.

Figure 4:
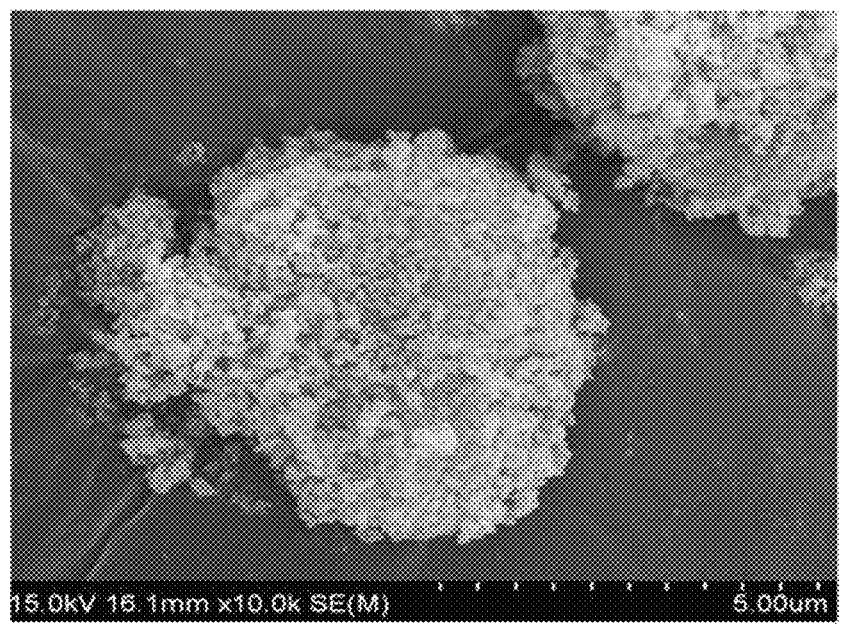
FIG. 4 is a scanning electron microscope (SEM) analysis graph showing nanonickel that has not passed through the crushing step.
Figure 5:
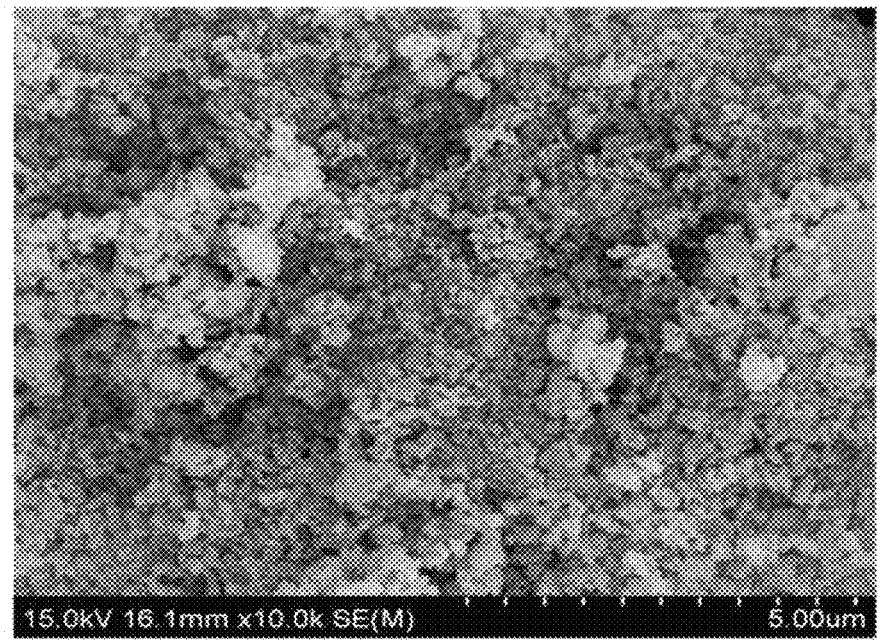
FIG. 5 is an SEM analysis graph showing nanonickel that has passed through the crushing step.
Figure 6:
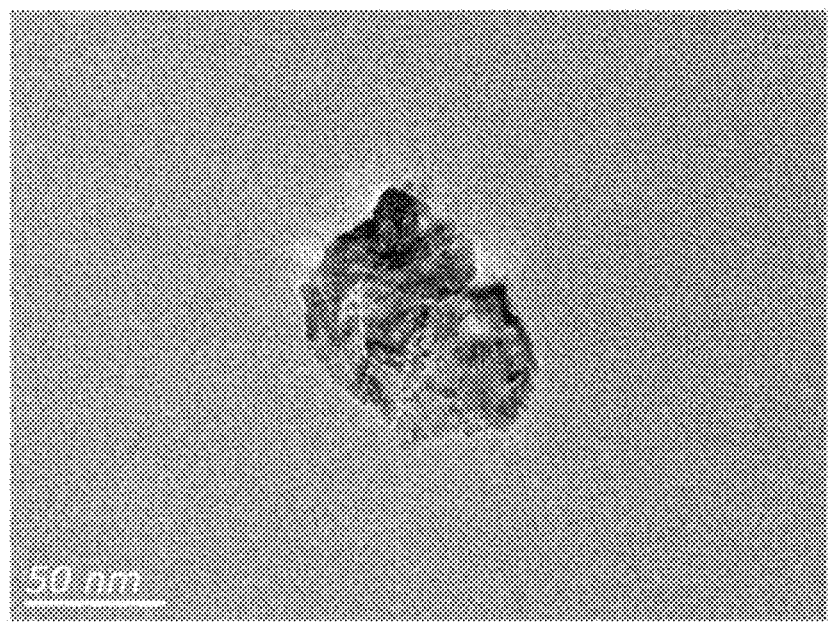
FIG. 6 is a transmission electron microscope (TEM) analysis graph showing nanonickel realized by the present invention.

For reference, FIG. 4 is a scanning electron microscope (SEM) analysis graph showing nanonickel that has not passed through the crushing step, FIG. 5 is an SEM analysis graph showing nanonickel that has passed through the crushing step by the present invention, and FIG. 6 is a transmission electron microscope (TEM) analysis graph showing nanonickel realized by the present invention.

The scope of the present invention is not limited to the above embodiments but defined by the appended claims, and it is apparent that various changes and modifications can be made within the scope of the present invention defined in the appended claims by those having ordinary skill in the art.

The invention claimed is:
1. A method for producing a nickel nanopowder, the method comprising:

(a) a step of preparing a nickel oxide;

(b) a nickel oxide nanopowder production step of pulverizing the nickel oxide to produce a nano-sized nickel oxide nanopowder;

(c) a step of drying the nickel oxide nanopowder;

(d) a step of heat-treating the nickel oxide nanopowder to produce a nickel nanopowder; and (e) a step of crushing the nickel nanopowder, wherein the step (d) includes producing the nickel nanopowder from the nickel oxide nanopowder by a reduction process in a hydrogen atmosphere, and supplying heat at the same time, and wherein the reduction process is performed at a hydrogen injection flow rate of 2.5 to 7.0 L/min and a temperature of 250° C. and 400° C. for a process time of 0.5 to 5.0 hr.

2. The method of claim 1, wherein the step (b) includes producing a nano-sized nickel oxide nanopowder by milling the nickel oxide using a rotating mill using a pulverizing medium.

3. The method of claim 2, wherein the nickel oxide nanopowder is produced by pulverizing the nickel oxide at a rotation speed of 1,000 to 4,000 rpm for 10 to 30 hours by using beads with a diameter of 0.3 to 3.0 mm as the pulverizing medium and using methanol or ethanol as a solvent.

4. The method of claim 3, wherein the beads are formed of at least one material selected from the group consisting of stainless steel, Zr, and carbon steel.

5. The method of claim 1, wherein the step (e) includes performing the crushing process at a rotation speed of 1,000 to 4,000 rpm for 1 to 5 hours using beads with a diameter of 0.3 to 3.0 mm as a crushing medium.

* * * * *